(12) United States Patent
Lee et al.

(10) Patent No.: US 7,595,128 B2
(45) Date of Patent: Sep. 29, 2009

(54) SAFETY DEVICE FOR SECONDARY BATTERY AND BATTERY PACK EMPLOYED WITH THE SAME

(75) Inventors: HakJun Lee, Seoul (KR); Yong-ho Cho, Yongin-si (KR)

(73) Assignee: LG Chem, Ltd. (KR)

( * ) Notice: Subject to any disclaimer, the term of this patent is extended or adjusted under 35 U.S.C. 154(b) by 544 days.

(21) Appl. No.: 11/556,473

(22) Filed: Nov. 3, 2006

(65) Prior Publication Data

US 2007/0122691 A1     May 31, 2007

(30) Foreign Application Priority Data

Nov. 30, 2005   (KR) .................... 10-2005-0115186

(51) Int. Cl.
    *H01M 2/34*   (2006.01)
(52) U.S. Cl. ........................................ 429/61; 429/121
(58) Field of Classification Search ............... 429/61, 429/121
    See application file for complete search history.

(56) References Cited

U.S. PATENT DOCUMENTS

| 5,279,910 A | 1/1994 | Sasaki et al. |
| 5,437,942 A | 8/1995 | Murata et al. |
| 5,972,539 A | 10/1999 | Hasegawa et al. |
| 6,531,847 B1 * | 3/2003 | Tsukamoto et al. ......... 320/135 |

* cited by examiner

*Primary Examiner*—Mark Ruthkosky
(74) *Attorney, Agent, or Firm*—Cantor Colburn LLP

(57) ABSTRACT

Disclosed herein are a safety device for secondary batteries that is capable of pressing a piezoelectric element using a seesaw member, which is constructed in a variable fixing structure, to generate electric current when a battery cell swells due to the abnormal operation or the degradation of the battery, and controlling the operation of the battery according to the generated electric current using a protection circuit module, thereby securing the safety of the battery, and a battery pack including a battery cell, which has low mechanical strength and high deformability, mounted in a frame member having the safety device, whereby the safety of the battery is improved and the assembly efficiency of the battery pack is improved.

9 Claims, 3 Drawing Sheets ized to accurately measure the swelling degree of the battery case through the surface change of the battery case while maintaining the limited size of the battery case. Furthermore, the strain gauge type sensor needs a large area for accurate measurement. As a result, the heat dissipation of the battery may be disturbed due to the strain gauge type sensor, and therefore, the temperature of the battery may be rather increased. For this reason, the strain gauge type sensor cannot be used in a thin battery, which has small surface swelling.

SAFETY DEVICE FOR SECONDARY BATTERY AND BATTERY PACK EMPLOYED WITH THE SAME

FIELD OF THE INVENTION

The present invention relates to a safety device for secondary batteries, and, more particularly, to a safety device for secondary batteries that is capable of pressing a piezoelectric element using a seesaw member, which is constructed in a variable fixing structure, to generate electric current when a battery cell swells due to the abnormal operation or the degradation of the battery, and controlling the operation of the battery according to the generated electric current using a protection circuit module, thereby securing the safety of the battery, and a battery pack including a battery cell, which has low mechanical strength and high deformability, mounted in a frame member having the safety device, whereby the safety of the battery is improved and the assembly efficiency of the battery pack is improved.

BACKGROUND OF THE INVENTION

As mobile devices have been increasingly developed, and the demand of such mobile devices has increased, the demand of secondary batteries has also sharply increased as an energy source for the mobile devices. Also, much research on batteries satisfying various needs has been carried out.

Especially, a lithium secondary battery has higher voltage and more excellent charge/discharge cycle characteristics than a conventional nickel-cadmium battery or a conventional nickel-metal hydride battery, and therefore, the demand of such a lithium secondary battery has sharply increased.

In terms of the shape of the battery, the demand of a rectangular battery or a pouch-shaped battery, which is thin enough to be applied to products, such as mobile phones, is very high. In terms of the material for the battery, the demand of a lithium secondary battery, such as a lithium cobalt polymer battery, having high energy density and high discharge voltage is very high.

The illustrative structure of a general polymer battery is shown in FIG. 1.

Referring to FIG. 1, a battery cell 100 comprises a battery case 110 and electrode terminals 101 and 102 protruding from the battery case 110.

In the battery case 110 is mounted an electrode assembly (not shown) comprising cathodes, anodes, and separators disposed between the cathodes and the anodes. The electrode terminals 101 and 102 are formed by welding electrode taps, which are attached to cathode and anode plates, to electrode leads. The electrode terminals 101 and 102 are partially exposed from the battery case 110. The electrode assembly is mounted in the battery case 110 while the electrode terminals 101 and 102 are partially exposed from the battery case 110, the battery case 110 is filled with a electrolyte, and edges 111 and 112 of upper and lower case parts of the battery case 110 are thermally welded to each other by applying heat and pressure to the edges 111 and 112. In this way, the battery cell 100 is manufactured.

Although the lithium secondary battery with the above-stated construction has more advantages than the conventional nickel-cadmium battery or the conventional nickel-metal hydride battery, the lithium secondary battery has a problem of weakness. Specifically, the electrolyte is injected into the battery case at the back-end process during the manufacture of the battery. For this reason, an organic solvent having low boiling point is generally used. In this case, however, the interior pressure of the battery case is increased when the battery is overcharged or when the battery is left under high temperature. As a result, the external appearance of the battery case may be deformed due to a swelling phenomenon, in which the electrode assembly or the battery case swells, and therefore, the battery case may explode.

In order to solve the above-mentioned problem, there have been proposed methods of hardening a plate-shaped battery using ultraviolet rays or electron beams or coating gel to electrode plates without injecting an electrolyte (U.S. Pat. Nos. 5,972,539, 5,279,910, and No. 5,437,942). These methods somewhat eliminate the swelling phenomenon, in which the electrode assembly or the battery case swells. However, the above-mentioned methods do not provide satisfactory safety.

Some prior arts propose a method of interrupting the operation of a pouch-shaped battery according to a value detected by a pressure sensor, i.e., strain gauge type sensor, which is attached to the surface of the battery, through a protection circuit disposed between terminals (a cathode and an anode) of the battery and input/output terminals. Specifically, when the battery case, i.e., the pouch, swells, the swelling degree is detected by the sensor, and the detected value is transmitted to the protection circuit, which interrupts the flow of electric current between the cathode and the anode when the detected value exceeds a predetermined level.

However, the method of measuring the swelling degree of the battery case has a limit in providing high reliability, and it is difficult to stably mount the sensor to the surface of the pouch-shaped battery. For example, the battery is minimized due to the reduction in size, weight, and thickness of the battery. Consequently, it is very difficult to accurately measure the swelling degree of the battery case through the surface change of the battery case while maintaining the limited size of the battery case. Furthermore, the strain gauge type sensor needs a large area for accurate measurement. As a result, the heat dissipation of the battery may be disturbed due to the strain gauge type sensor, and therefore, the temperature of the battery may be rather increased. For this reason, the strain gauge type sensor cannot be used in a thin battery, which has small surface swelling.

Consequently, the necessity of a technology to fundamentally solve the above-mentioned problems is highly increased.

SUMMARY OF THE INVENTION

Therefore, the present invention has been made to solve the above-mentioned problems, and other technical problems that have yet to be resolved.

As a result of a variety of extensive and intensive studies and experiments to solve the problems as described above, the inventors of the present application have discovered that, when a battery swells, the expansion or the explosion of the battery due to the abnormal operation or the degradation of the battery is effectively prevented by pressing a piezoelectric element using a specific seesaw member, which is constructed in a variable fixing structure, to generate electric current, and controlling the operation of the battery according to the generated electric current using a protection circuit module, thereby securing the safety of the battery. The present invention has been completed based on the above-mentioned discovery.

In accordance with one aspect of the present invention, the above and other objects can be accomplished by the provision of a safety device for secondary batteries, comprising: an element ("a piezoelectric element") electrically connected to a protection circuit module for generating electric current when the piezoelectric element is pressed; a member ("a seesaw member") having one end (a) being in contact with one of opposite surfaces of a plate-shaped battery cell and the other end (b) being in contact with the surface of the piezoelectric element, wherein the seesaw member is variably fixed to a predetermined region such that, when the end (a) is raised due to the swelling of the battery cell, the end (b) is lowered to press the piezoelectric element.

Consequently, when the battery cell swells due to the abnormal operation or the degradation of the battery, the safety device for secondary batteries according to the present invention presses the piezoelectric element using the seesaw member to generate electric current, and controls the operation of the battery according to the generated electric current using the protection circuit module, whereby the safety device can sensitively respond to a small change, and therefore, the safety of the battery is secured.

FIG. 2 is a typical view illustrating the operating principle of the seesaw member in the present invention.

Referring to FIG. 2, when a swelling phenomenon of the battery occurs, the end (a) of the seesaw member performs a circular rotary movement. At this time, a force is transmitted, only in the Y-axis direction, to the opposite end (b) of the seesaw member, which is structurally restricted in the X-axis direction, about a variable fixing axis disposed between the opposite ends of the seesaw member. Consequently, the rotary movement is changed into a linear movement at the opposite end (b) of the seesaw member, and energy of the linear movement is converted into an electric signal by a piezoelectric element. Furthermore, in the case that the distance between the end (a) and the variable fixing axis is greater than the distance between the end (b) and the variable fixing axis, the change at the end (a) is larger, and therefore, the end (b) presses the piezoelectric element with a larger lowering force in proportion to the distance difference. Consequently, the operational reliability of the piezoelectric element is improved.

Preferably, the piezoelectric element and the seesaw member are mounted to a frame member, in which the battery cell is mounted. In this case, a pouch-shaped battery cell, which has low mechanical strength and high deformability, can be manufactured in the shape of a predetermined standard battery pack by the frame member. Consequently, the damage to the terminals is prevented and the assembly efficiency is improved.

The fixing mode of the seesaw member is not particularly restricted so long as a portion of the seesaw member is variably fixed such that the seesaw can be operated according to the principle shown in FIG. 2. Preferably, the seesaw member is connected to the frame member by a hinge structure. When the seesaw member is connected to the frame member by the hinge structure, the hinge structure constitutes a variable fixing as (a variable rotation axis). Consequently, when the end (a) of the seesaw member, which is in contact with the surface of the battery cell, is raised due to the swelling of the battery cell, the end (b) of the seesaw member, which is in contact with the surface of the piezoelectric element, is lowered. As a result, electric current is generated from the piezoelectric element. The generated electric current is transmitted to a protection circuit module via cables connected to the piezoelectric element.

In a preferred embodiment, the frame member may be provided at the center of the upper end thereof with a depression, in which the piezoelectric element is mounted, and the end (a) side region of the seesaw member is inserted and connected. Generally, a secondary battery is required to be compact and light. For this reason, the increase in size of the secondary battery due to the provision of the piezoelectric element and the seesaw member is not desirable. Consequently, it is possible to minimize the increase in size of the battery pack due to the provision of the safety device comprising the piezoelectric element and the seesaw member by forming the depression according to the present invention.

Generally, the increase in the internal pressure of the battery is greater in the thickness direction of the battery than in the longitudinal direction of the battery. Specifically, when the internal pressure of the battery increases, the increase in thickness of the battery case is greater than the surface expansion of the battery case. Consequently, in the case that the seesaw member is constructed in a long plate structure, and the first end (b) of the seesaw member has a length arriving at or near the center of the battery cell, the above-mentioned thickness change of the battery is detected, and therefore, more accurate measurement at the piezoelectric element is accomplished.

In accordance with another aspect of the present invention, there is provided a battery pack including the safety device constructed as described above.

The technology according to the present invention may be applied to a battery pack constructed in a structure in which various kinds of battery cells are mounted in the battery pack. Especially, the technology according to the present invention may be applied to a battery pack including a battery cell comprising a battery case, which is made of a laminate sheet including a metal layer and a resin layer, and an electrode assembly mounted in the battery case, the battery cell having low mechanical strength. A typical example of the battery cell is a pouch-shaped battery cell manufactured by placing an electrode assembly in a folding type pouch-shaped case, which is made of an aluminum laminate sheet, and thermally welding the upper end and the opposite sides of the pouch-shaped case such that the case can be sealed.

In a preferred embodiment, the battery pack is constructed in a structure in which the battery pack is mounted in a frame member surrounding the sealed upper end and the sealed opposite sides of the battery cell. Since the battery pack is mounted in the frame member, which surrounds the sealed upper end and the sealed opposite sides of the battery cell, it is possible to manufacture the battery to a predetermined standard while proving sufficient strength to the battery, thereby improving assembly efficiency.

Other construction of the battery pack and a method of manufacturing the battery pack are well known in the art to which the present invention pertains, and therefore, the detailed description thereof will not be given.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF MAIN REFERENCE NUMERALS OF THE DRAWINGS

| | |
|---|---|
| 100: battery cell | 101, 102: cathode/anode terminal |
| 210: seesaw member | 211: hinge member |
| 220: piezoelectric element | 240: frame member |

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 3:
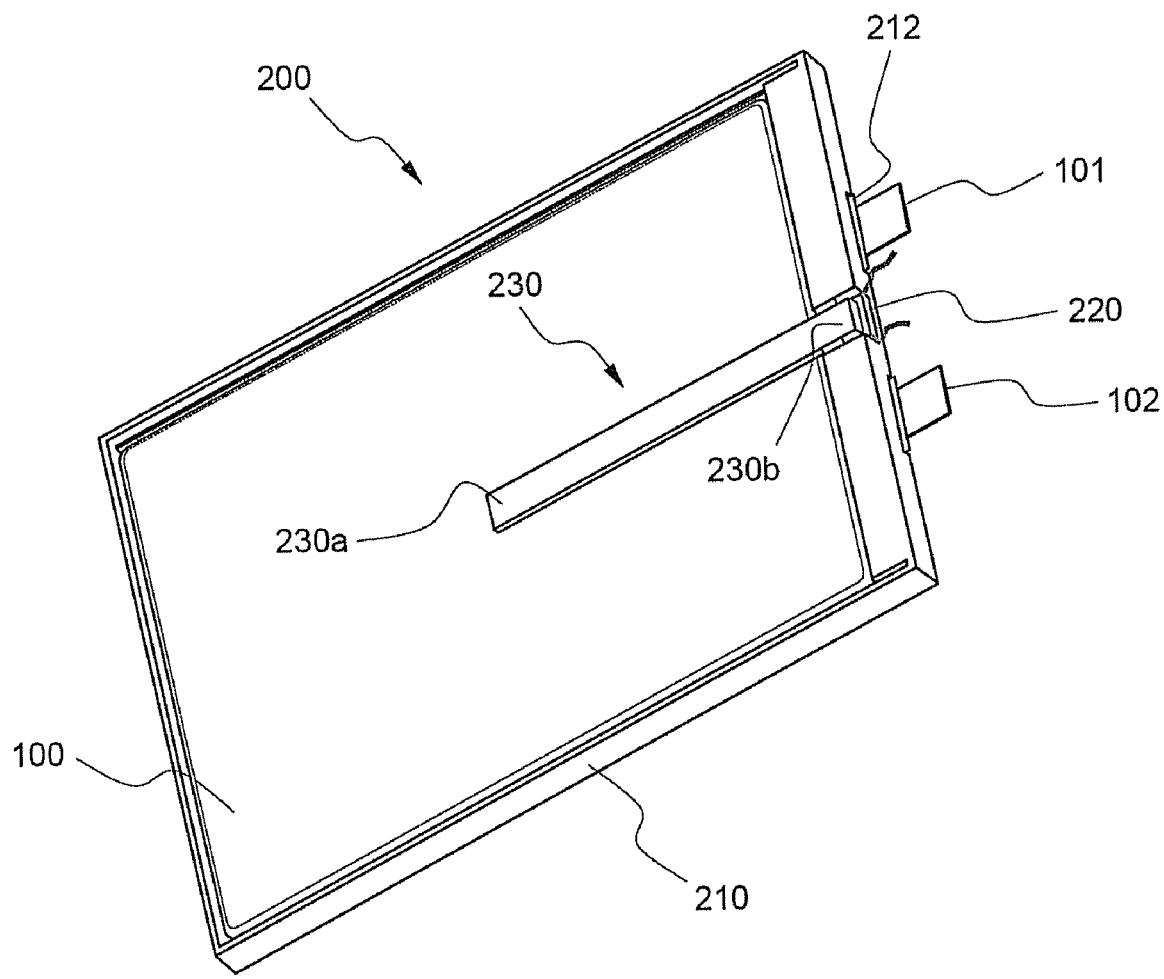
FIGS. 3 and 4 are a perspective view and a partially enlarged view illustrating a battery pack having a safety device according to a preferred embodiment of the present invention mounted thereto.

FIG. 3 is a typical view illustrating the structure of a battery pack having a safety device according to a preferred embodiment of the present invention mounted thereto.

Figure 1:
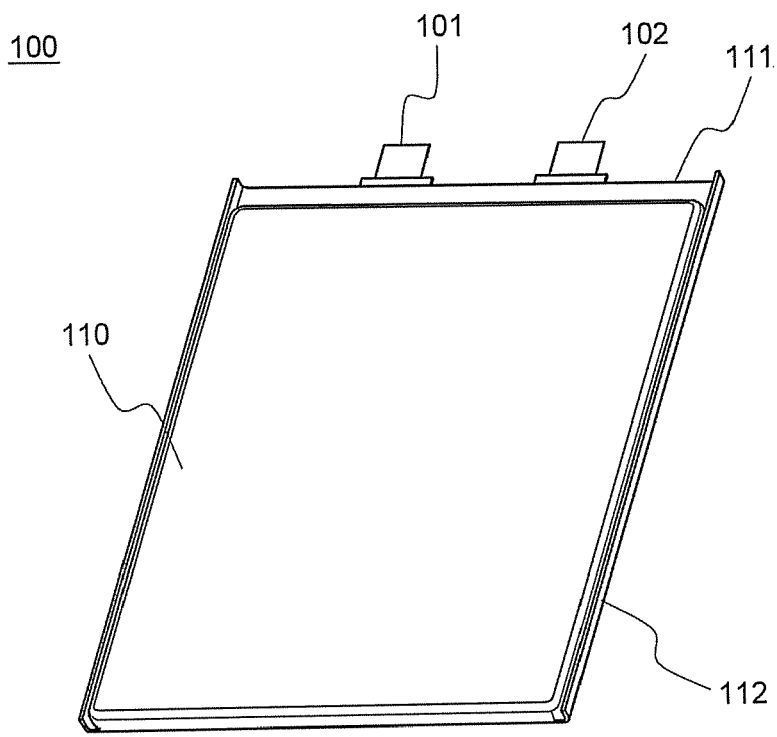
FIG. 1 is a perspective view illustrating a general polymer battery.
Figure 2:
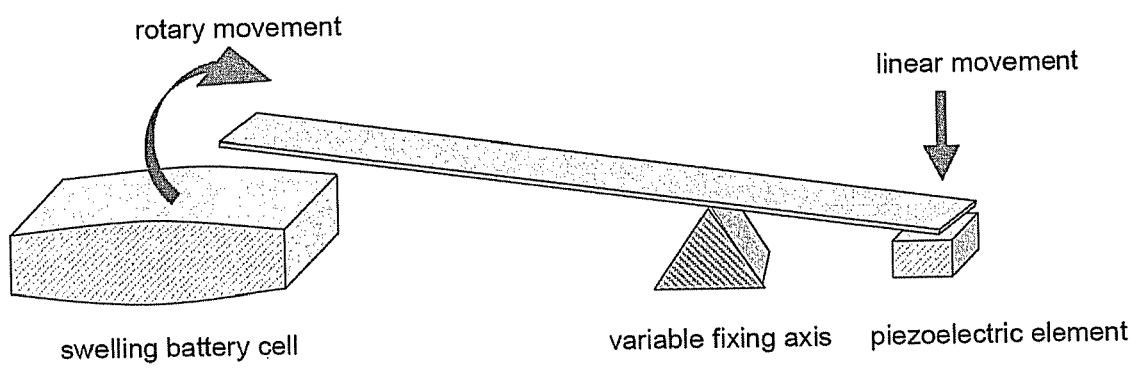
FIG. 2 is a typical view illustrating the operating principle of a seesaw member in the present invention.

Referring to FIG. 3, the battery pack 200 comprises a pouch-shaped battery cell 100, which is constructed as shown in FIG. 1, and a pack frame 210 mounted to the battery cell 100 such that the outer circumference of the battery cell 100 can be surrounded by the pack frame 210. Specifically, the pack frame 210 is constructed with a lattice type structure in which the upper and lower parts of the pack frame 210 are open such that the pack frame 210 is mounted to the battery cell 100, a side sealing part of which is upwardly bent along the vertical direction, from above the battery cell 100. At the upper end of the rear part of the pack frame 210 are formed depression grooves 212, in which the cathode terminal 101 and the anode terminal 102 of the battery cell 100 are located when the pack frame 210 is mounted to the battery cell 100. To the upper end of the front part of the pack frame 240 is mounted a piezoelectric element 220. Also, a seesaw member 230 is connected to the upper end of the front part of the pack frame 240 by a hinge structure.

Consequently, when the battery cell 100 swells due to abnormal operation or degradation of the battery cell 100 mounted to the pack frame 210, one end 230a of the seesaw member 230 is raised due to the swelling of the battery cell 100, and the other end 230b of the seesaw member 230 is lowered to press the piezoelectric element 220. Electric current generated from the pressed piezoelectric element 230 is transmitted to a protection circuit module (not shown).

The details will be described below with reference to FIG. 4, which is an enlarged view illustrating the piezoelectric element and the seesaw member connected to the pack frame of the battery pack shown in FIG. 3.

Figure 4:
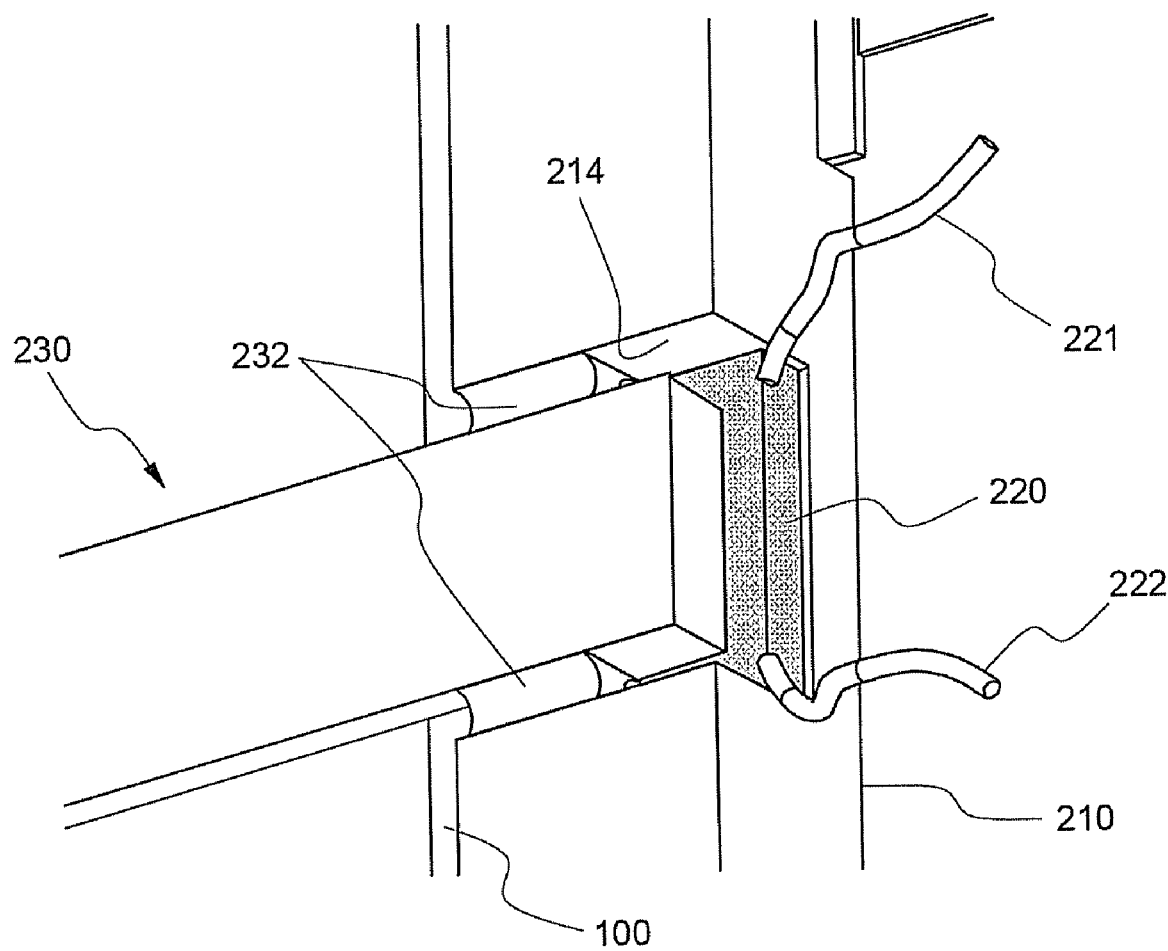

Referring to FIG. 4, a depression 214 having a predetermined size is formed at the center of the upper end of the pack frame 240. The piezoelectric element 220 is mounted in the depression 214. The piezoelectric element 220 is connected to the protection circuit module (not shown) via a pair of wires 221 and 222.

Both sides of the seesaw member 230 are integrally connected to the depression 214 of the pack frame 240 via hinges 232. The seesaw member 230 is located such that the end 230b of the seesaw member 230 is in contact with or adjacent to the surface of the piezoelectric element 220. The hinges 232 serve to fix the seesaw member 230 to the pack frame 210 while the hinges 232 guarantee variable upward and downward movement of the end 230b of the seesaw member 230. As a result, the hinges 232 serve as a variable rotation axis of the seesaw member 230. Since the hinges 232 are connected to the inside surface of the depression 214, the seesaw member 230 is located in the state that the seesaw member 230 is substantially inserted in the depression 214, and therefore, the increase in size of the battery pack is maximally restrained although the seesaw member 230 is mounted in the battery pack.

When the other end (not shown) of the seesaw member 230, which is in contact with the surface of the battery cell 100, is raised by the swelling of the battery cell 100, the end 230b of the seesaw member 230, which is in contact with the surface of the piezoelectric element 220, is lowered to press the piezoelectric element 220, by which electric current is generated. The generated electric current is transmitted to the protection circuit module via the wires 221 and 222 such that the operation of the battery is controlled by the protection circuit module.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, the safety device for secondary batteries according to the present invention and the battery pack use the seesaw member and the piezoelectric sensor, which are variably fixed. Consequently, it is possible to control the operation of the battery by accurately detecting the swelling of the battery cell due to the abnormal operation or the degradation of the battery, whereby the safety of the battery is improved. Furthermore, the pouch-shaped battery cell, which has low mechanical strength and high deformability, is mounted in the frame member, which has the safety device. Consequently, the damage to the battery cell is prevented and the assembly efficiency is improved during the assembly or the use of the battery pack.

What is claimed is:

1. A safety device for secondary batteries, comprising:
    a piezoelectric element electrically connected to a protection circuit module for generating electric current when the piezoelectric element is pressed;
    a member a seesaw member having one end (a) being in contact with one of opposite surfaces of a plate-shaped battery cell and the other end (b) being in contact with the surface of the piezoelectric element, wherein
    the seesaw member is variably fixed to a predetermined region such that, when the end (a) is raised due to the swelling of the battery cell, the end (b) is lowered to press the piezoelectric element.

2. The safety device according to claim 1, wherein the piezoelectric element and the seesaw member are mounted to a frame member, in which the battery cell is mounted.

3. The safety device according to claim 1, wherein the seesaw member is connected to the frame member by a hinge structure.

4. The safety device according to claim 2, wherein the frame member is provided at the center of the upper end thereof with a depression, in which the piezoelectric element is mounted, and the end (a) side region of the seesaw member is inserted and connected.

5. The safety device according to claim 1, wherein the seesaw member is constructed in a long plate structure, and the first end (b) of the seesaw member has a length arriving at or near the center of the battery cell.

6. A battery pack including a safety device according to claim 1.

7. The battery pack according to claim 6, wherein the battery pack further includes a battery cell comprising a battery case, which is made of a laminate sheet including a metal layer and a resin layer, and an electrode assembly mounted in the battery case, and wherein the safety device is mounted to the battery pack.

8. The battery pack according to claim 7, wherein the battery cell is manufactured by placing the electrode assembly in a folding type pouch-shaped case, which is made of an aluminum laminate sheet, and thermally welding the upper end and the opposite sides of the pouch-shaped case such that the case can be sealed.

9. The battery pack according to claim 8, wherein
the battery cell is mounted in a frame member, which is constructed with a lattice type structure in which the upper and lower parts of the frame member are open such that the battery cell, the side sealing part of which is upwardly bent along the vertical direction, can be mounted in the frame member,
the frame member is provided at the upper end of the rear part thereof with depression grooves, in which electrode terminals of the battery cell are located, and
the frame member is provided at the upper end of the front part thereof with a depression, in which a piezoelectric element is mounted and to which a seesaw member is connected by a hinge structure.

* * * * *